United States Patent [19]

Brognano et al.

[11] 4,289,954
[45] Sep. 15, 1981

[54] ENERGY CONSERVING SYSTEM FOR USE WITH HEATING AND/OR HOT WATER SYSTEMS AND THE LIKE

[76] Inventors: R. Joseph Brognano, 421 Briarwood Rd., North Massapequa, N.Y. 11758; Albert Buonasera, 134 N. Boylan La., Blue Point, N.Y. 11715

[21] Appl. No.: 169,769

[22] Filed: Jul. 17, 1980

Related U.S. Application Data

[63] Continuation of Ser. No. 840,985, Oct. 11, 1977, abandoned.

[51] Int. Cl.³ .............................................. H05B 1/02
[52] U.S. Cl. .................................... 219/307; 219/319;
219/333; 219/330; 219/489; 219/483; 322/8;
307/39; 363/148
[58] Field of Search ............................ 219/483–486,
219/306, 307, 308, 309, 316, 319, 482, 488, 330,
333, 326; 307/117, 39–41, 84, 85; 363/148–156;
322/6, 8, 35; 361/52; 310/29, 68 E, 112, 113

[56] References Cited

U.S. PATENT DOCUMENTS

| 1,376,428 | 5/1921 | Hellmund | 363/149 |
| 1,955,471 | 4/1934 | Pooler | 363/148 X |
| 2,180,796 | 11/1939 | Claytor | 322/35 X |
| 3,103,575 | 9/1963 | Pecci | 219/314 X |
| 3,387,202 | 6/1968 | Buffington | 363/150 |
| 3,979,576 | 9/1976 | Janson | 219/364 |
| 4,058,759 | 11/1977 | Halfhill | 322/13 |
| 4,068,114 | 1/1978 | Johnson et al. | 219/333 |
| 4,079,446 | 3/1978 | Hertz | 363/150 |
| 4,103,325 | 7/1978 | Hyman et al. | 363/148 |

FOREIGN PATENT DOCUMENTS

| 229985 | 11/1963 | Austria | 219/306 |
| 2286353 | 4/1976 | Fed. Rep. of Germany | 219/306 |

Primary Examiner—Gene Z. Rubinson
Assistant Examiner—Mark H. Paschall
Attorney, Agent, or Firm—Weinstein & Sutton

[57] ABSTRACT

A fully automatic system for providing electrical energy to heating and/or hot water systems in facilities serviced by single phase a.c. comprising a three-phase generator driven by single phase a.c. motor means intermittently operated on a load requirement basis wherein the three-phase generator output is normally maintained in an open-circuited condition. Upon controlled load demand, the motor means is energized and the three-phase output is connected to the load only upon achieving optimum operating speed, at which time switch means automatically connects the load to the three-phase output, which on-line condition is maintained until thermostatic control means senses the fact that the system has achieved the desired temperature level at which time the single phase motor means is deenergized.

Additional sensing means are provided for protecting the system against damage due to excessive temperature and/or low level conditions.

In an alternative embodiment, phase-to-neutral connections may be established to provide 277 volt phase to neutral three-phase power, having been converted from 480 volt phase to phase output lines. The available power is preferably connected through a distribution panel to power electrical resistive type heating elements.

9 Claims, 3 Drawing Figures

ENERGY CONSERVING SYSTEM FOR USE WITH HEATING AND/OR HOT WATER SYSTEMS AND THE LIKE

This is a continuation of application Ser. No. 840,985, filed Oct. 11, 1977 now abandoned.

BACKGROUND OF THE INVENTION

Private consumers are typically provided with single phase a.c. power. Heating and hot water systems however are more economically operated when serviced with three phase a.c. power. However, it is more economical for utilities to provide private consumers with single phase a.c. service.

BRIEF DESCRIPTION OF THE INVENTION

The present invention is characterized by providing three-phase energy at increased voltage and power ratings, said energy being derived from a single phase a.c. source. The system includes motor means powered by a single phase a.c. source and provides an output in the form of a rotating shaft operating at a predetermined rpm. Three-phase generator means is mechanically driven by the output shaft of the single phase motor means and at a predetermined drive ratio to develop three-phase a.c. energy of increased voltage and power ratings. Thermostatic control means monitors the temperature level of the water heater (or space being heated) and automatically energizes the motor means when the desired conditions drop below the desired level. The load, which is normally disconnected from the three-phase generator electrical output, is automatically switched-in when optimum generator rpm is reached. The load is maintaind in this fashion until the desired temperature is achieved at which time the motor is again deenergized, this operation being continually repeated as a function of the system specifications.

As an alternative embodiment, the three-phase delta output may be provided with a grounded neutral coupling three-phase output power in wye fashion through a panel board to suitable output utilization means such as electrical resistive heating means, for example.

BRIEF DESCRIPTION OF THE FIGURES AND OBJECTS OF THE INVENTION

It is therefore one object of the present invention to provide novel apparatus for converting economically produced single phase a.c. energy into three-phase output energy upon demand for efficient operation of heating and/or hot water systems.

Still another object of the present invention is to provide a system of the type described thereinabove and including thermostatic control means for powering the system at requirements based upon said heating and/or hot water systems.

Still another object of the present invention is to provide novel switch means for coupling an electrical load to the three-phase power generating means only after achieving optimum rpm conditions.

The above as well as other objects of the present invention will become apparent when reading the accompanying description and drawings in which.

DETAILED DESCRIPTION OF THE INVENTION AND THE PREFERRED EMBODIMENTS THEREOF

Figure 1:
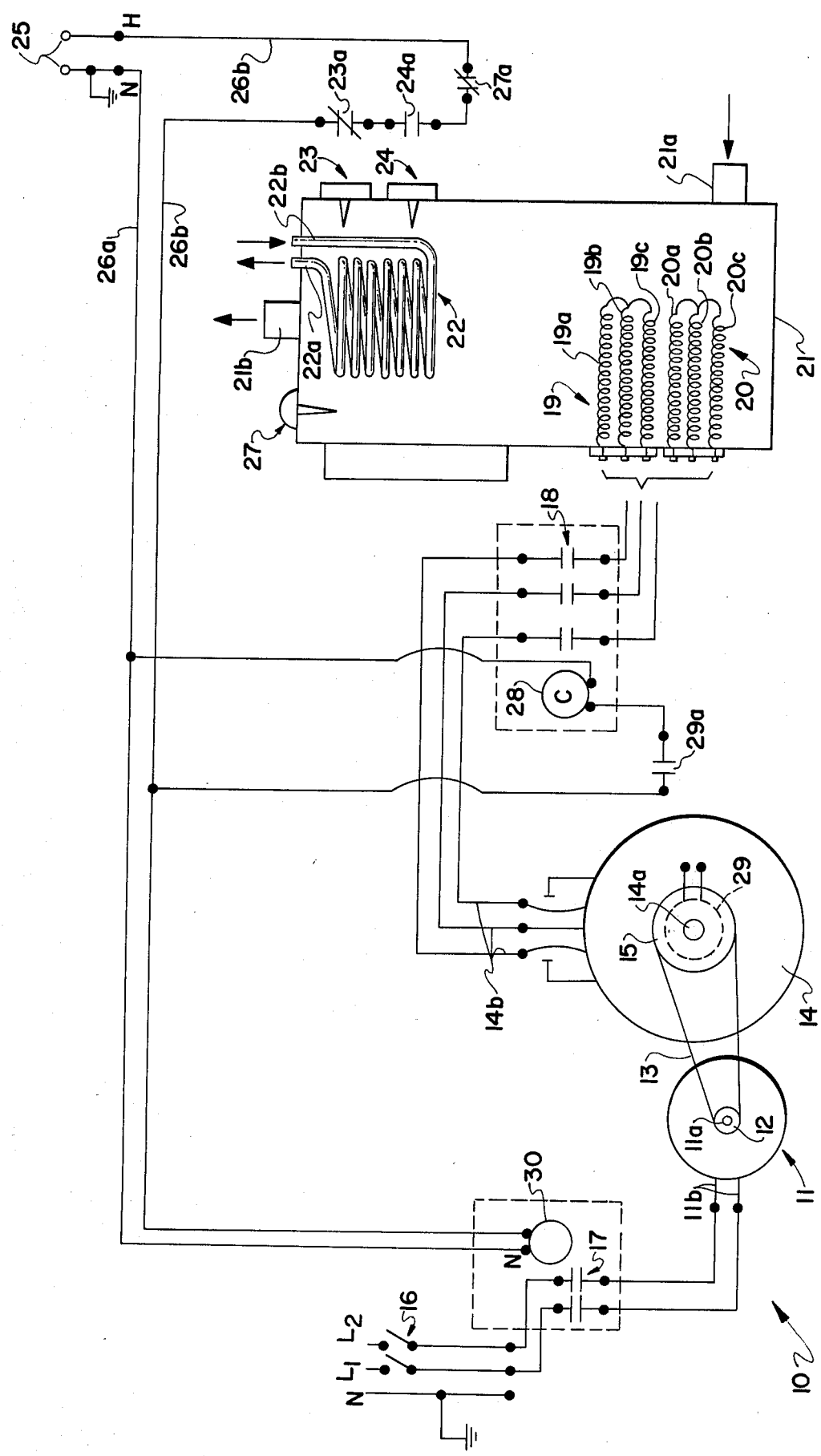
FIG. 1 is a schematic diagram showing generation apparatus designed in accordance with the principles of the present invention.
Figure 2:
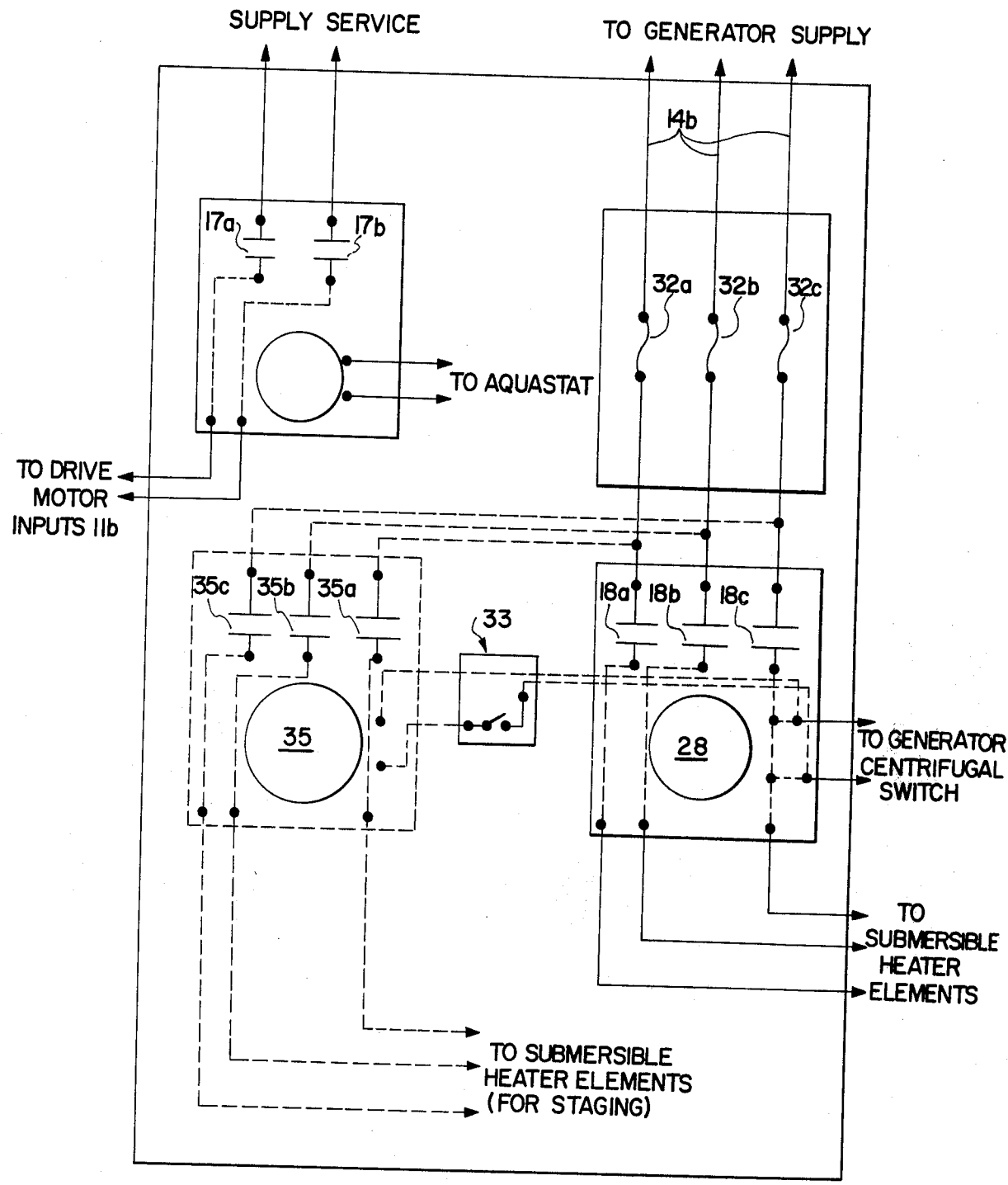
FIG. 2 shows a detailed schematic diagram for the system of FIG. 1.

FIGS. 1 and 2 show a system 10 which is designed in accordance with the principles of the present invention and is comprised of a single phase a.c. motor means 11 having an output shaft 11a coupled through pulley 12 and drive belt 13 to a pulley 15 of three-phase power generator 14, pulley 15 being connected to the input shaft 14a of the three-phase power generator. Power drive motor 11 is a single phase a.c. motor in the preferred embodiment having a five horse power rating at 230 volts input and designed to develop 3600 rpm at its output shaft. The electrical generator is of a three-phase type designed to develop 460 volts phase to phase in delta fashion when driven at 1800 rpm. The drive ratio can therefore be seen to be two to one, which is achieved by judicious selection of the diameters of pulleys 12 and 15.

The electrical input terminals 11b of single phase motor 11 derive power from input lines L1 and L2 through safety switch 16 and normally open contactor sets 17a and 17b. The electrical outputs 14b of three-phase generator 14 are connected through normally open contactors 18a–18c to electrical heater elements 19a–19c connected to the three-phase electrical output and rated to match the voltage output of the power generator 14. As shown in FIG. 1 a second set of heating elemens 20a through 20c is provided the elements of which are connected in electrical parallel with the heater elements 19a–19c.

Elements 19a–19c and 20a–20c are mounted within the water in hot water tank 20 and preferably are of the submersible type. The heated water which makes direct contact with the heater elements, leaves tank 21 through hot water feed outlet 21b whereas return water enters through inlet 21a.

Tank 21 may also be provided with a hot water coil 22 which is arranged to derive heat from the heated water and pass the water into the domestic hot water system through outlet end 22a. Fresh water enters through inlet end 22b to be heated.

Sensing means 23 is provided to measure high water temperature while sensor 24 is provided to sense ambient temperature. Both devices are of the aquastat type to provide cutoff of energy to the system when their conditions are sensed.

Local single phase power is also provided at input terminal 25 and is coupled to leads 26a and 26b. The contactors 23a and 24a for sensors 23 and 24 respectively are connected in series as shown. A low water cutoff sensor 27 monitors the water level in tank 21 and has its normally closed contactor 27a connected in series with contactors 23a and 24a.

Solenoid coil 28 is connected in parallel across lines 26a and 26b and further has a contactor 29 connected in series therewith. Solenoid coil 30 is also connected across lines 26a and 26b.

The operation of the system shown in FIGS. 1 and 2 is as follows:

Presuming the water in tank 21 is at a safe level, sensor means 27 remains in the quiescent state so that its contactor 27a remains normally closed, as shown. Further presuming the water temperature to be below the excessive heat level, sensor 23 remains in the quiescent state leaving its contact set 23a in the normally closed state. Presuming the water in tank 21 to be below the desired temperature level, sensor 24 operates to close its normally open contact set 24a. In this condition a circuit is completed to energize solenoid 30, closing normally opened contacts 17a and 17b. Presuming the safety switch 16 is closed, motor 11 is energized causing its output shaft to begin rotation. This mechanical output energy is coupled to the input shaft 14a of generator 14. A centrifugal switch structure 29 is mounted upon the generator input shaft and functions so that its contact set 29a is maintained normally open until the centrifugal switch is caused to rotate at a preset rpm in which case the contact set 29a is closed causing solenoid 28 to be energized to close normally open contacts 18a-18c and thereby couple three-phase power from generator 14 to the heater element 19a-19c (and/or 20a-20c).

When the temperature level of the water in tank 21 reaches a preset value, sensor means 23 is activated to close its normally open contact set 23a thereby deenergizing solenoids 28 and 30 causing the load 19 (and/or 20) to be disconnected from power generator 14 and further causing input power to be disconnected from single phase a.c. motor 11 whereby these elements are free to coast to a standstill under a no-load (or a load) condition.

Operating in the same fashion, the water level sensor 27 and the excessive temperature level sensor 23 will open circuit their normally closed contact sets in the event that the water in tank 21 drops below a safe level or in the event that the temperature level of the water is excessively high according to the setting of sensor 23.

As shown in FIG. 2, when staging is desired, the contact set 29a of centrifugal switch 29 closes to initially enregize solenoid coil 28 and simultaneously therewith energizes the automatic time delay switch 33 which functions to close a predetermined adjustable time delay after energization whereupon solenoid coil 35 becomes energized at the end of the aforesaid predetermined time delay to close normally-open contact sets 35a-35c and thereby energize the heater elements connected thereto for staging applications.

Figure 3:
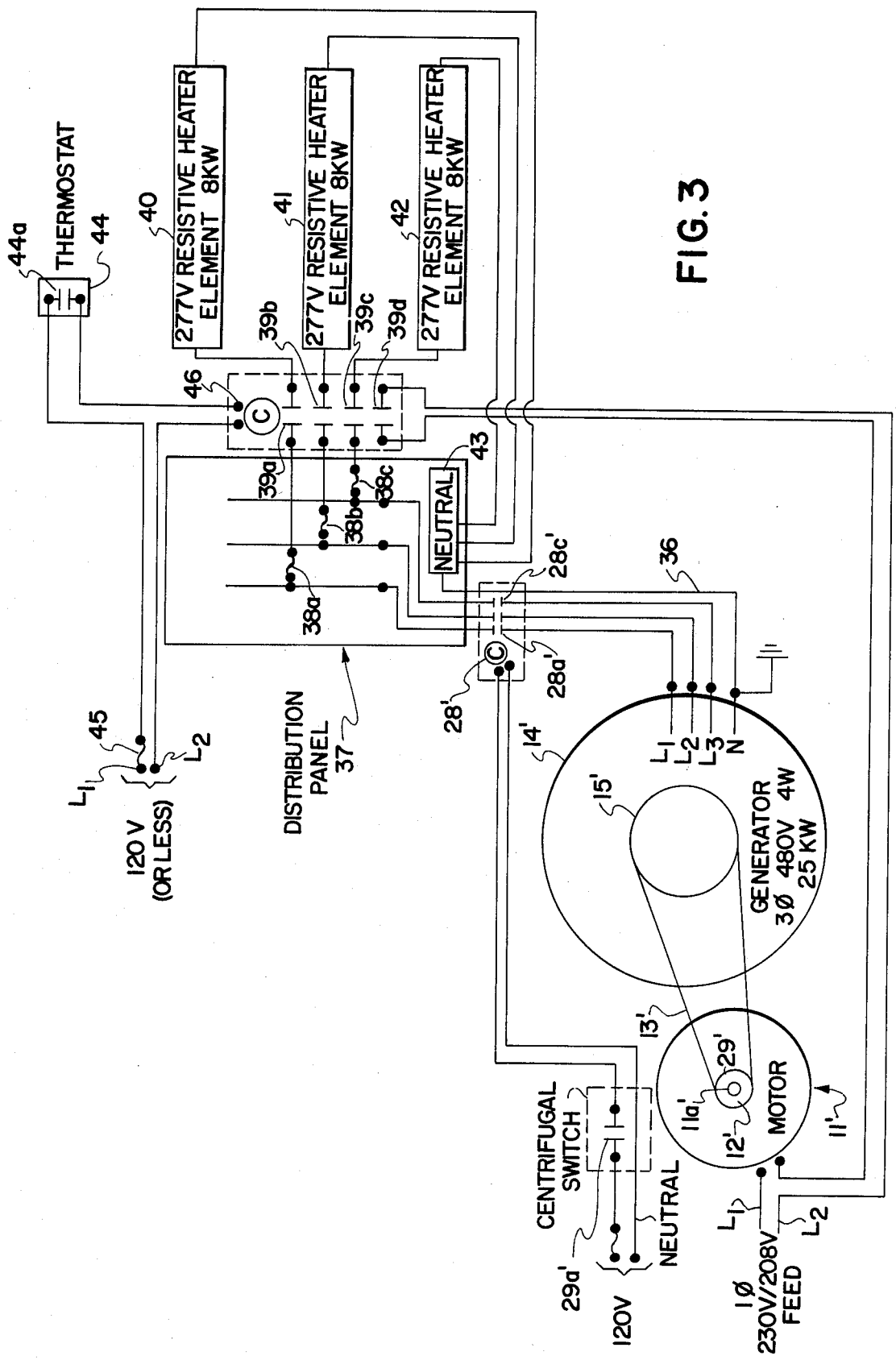
FIG. 3 shows a schematic diagram of an alternative embodiment of the present invention.

FIG. 3 shows an alternative embodiment in which the three-phase output of generator 141 is provided with a neutral line 36. The neutral line and the three-phase lines are connected to distribution panel 37 for coupling power through protective fuses 38a-38c and contact sets 39a-39c to the electrical heating elements 40-42 respectively, each electrical heating element being connected between one of the three-phase output terminals and neutral bus 43. Thermostat 44 is provided to decouple power from the heating elements when the area being heated reaches the desired temperature level. Power is provided from lines L1 and L2 through fuse 45 to power thermostat 44 connected in series with fuse 45 and solenoid 46.

In the arrangement shown in FIG. 3, the cenrifugal switch $29^1$ is mounted upon the output shaft $11a^1$ of single phase motor $11^1$.

The operation of the alternative embodiment of FIG. 3 is as follows:

When the room temperature falls below a desired level, thermostat 44 closes its normally open contact set 44a establishing a closed circuit path which energizes solenoid 46 to close contact sets 39a-39d. The closure of contact set 39d couples electrical power from single phase a.c. feeder lines L1 and L2 to motor $11^1$. The motor begins rotation and imparts this rotation to generator $14^1$ through belt $13^1$. However, since centrifugal switch $29^1$ is open at this time, solenoid $28^1$ is deenergized causing its contacts 18a-18c to remain open.

When motor $11^1$ reaches the desired rpm, centrifugal switch $29^1$, in this embodiment mounted upon the output shaft of motor $11^1$, closes its normally open contact set, $29I^a$ to energize solenoid $28^1$ thereby closing contact sets $28a^1$-$28c^1$ whereupon phase to ground power is coupled into the distribution panel 37. The individual output lines are coupled through fuses 38a-38c and now closed contact sets 39a-39c to each of the electrical heater elements 40-42 respectively whose opposite terminals are coupled to neutral 43 so as to provide a phase to neutral voltage which, in the preferred embodiment, is 277 volts phase-to-neutral.

When the region being heated reaches the desired temperature level, thermostat 44 becomes quiescent causing its contact set 44a to move to the open state thereby deenergizing contactor 46 to open contact sets 39a-39c coupled to the electrical heater elements 40-42 and further to open circuit contact set 39d thereby decoupling motor $11^1$ from the single phase input power being provided thereto.

If desired, electrical elements 40-42 may be arranged within an air handling unit of the forced air heating heating type. The elements 40-42 may alternatively be three-phase elements as described hereinabove. The arrangements shown provide higher voltage, higher power output than is consumed by the drive motor functions to provide the mechanical drive torque necessary for operating a three-phase power generator. Higher output is utilized by a series of electrical heating elements rated to match the voltage output of the power generator enabling the use of standard low cost electrical energy at a low power consumption level. In the embodiment shown in FIG. 1, water tank 21 may alternatively be a steam boiler tank which transfers its heat to the hot water or steam which is distributed to baseboard or other types of heating equipment through the inlet and outlet connectors 21a and 21b as shown in FIG. 1. The recovery rate of the system described herein is believed to be faster than flame-type heating systems, in addition to the economies derived from the use of the system.

The ratio between the rpm of motor output shaft 11a and the rpm of generator input shaft 14a need not be 2:1 but may be any other suitable ratio, the particular ratio mentioned herein being chosen to enable the use of a smaller and hence more economical motor.

Although there has been described herein preferred embodiments of this novel invention, many variations and modifications will be now apparent to those skilled in the art. Therefore, this invention is to be limited, not by the specific disclosure herein, but only by the appending claims.

What is claimed is:

1. Apparatus for providing electrical energy at low consumption and high efficiency for use in heating and-/or hot water systems, comprising:

single phase motor means powered by an independent single phase a.c. source for driving its output shaft;

multiphase electrical generator means having mechanical input means;

mechanical means for coupling the output shaft of said motor means to the mechanical input means of said multiphase generator means for generating multiphase output power at the electrical outputs of said multiphase electrical generator means, wherein the electrical outputs of said multiphase electrical generator means are electrically isolated from said independent single phase a.c. source;

multiphase load means for converting electrical energy into heat for heating a fluid, said load means being electrically isolated from said single phase a.c. source and having ratings matching the output power ratings and operating frequency of said multiphase electrical generator means wherein the electrical isolation of said multiphase electrical generator means and said single phase source permits the selection of an electrical generator having an operating frequency which is different from the operating frequency of the single phase a.c. source to optimize the match between the multiphase electrical generator means and the multiphase load means regardless of the operating frequency of the single phase a.c. source;

first switch means for normally maintaining said multiphase load means electrically disconnected from the electrical outputs of said multiphase electrical generator means;

said switch means being responsive to said multiphase electrical generator means reaching a predetermined operating condition for electrically connecting said multiphase load means to said multiphase electrical generator means thereby enabling said single phase motor means and said multiphase electrical generator means to reach optimum operating conditions at a more rapid rate;

thermostat means for sensing the temperature level of the fluid being heated; and second switch means responsive to said thermostat means for electrically disconnecting said motor means from said a.c. soruce when the fluid being heated reaches a predetermined level and for electrically reconnecting said motor means to said a.c. source when the temperature level in the fluid being heated drops below said predetermined level.

2. The apparatus of claim 1 further comprising a water tank;

said multiphase load means being multiphase electrical elements of the submersible type and being submersed within said water tank in order to heat the liquid contents thereof.

3. The apparatus of claim 2 further comprising sensor means for sensing the liquid level in said tank and for disconnecting said motor means from said a.c. source when the liquid in said tank drops below a predetermined level and for reconnecting said motor means to said a.c. source when the liquid in said tank surpasses the above-mentioned level.

4. The apparatus of claim 3 further comprising sensing means adapted to sense excessive temperature levels and being adapted to disconnect said motor means from input power when the temperature in said tank surpasses a predetermined excessive level and for reconnecting said motor to said input power when the temperature in said tank drops below said predetermined excessive temperature level.

5. The apparatus of claim 4 wherein each of said sensing means comprises a contact set and said contact sets are all connected in electrical series with a solenoid means and said series path is coupled to said input power;

connector means coupled between said input power and the input of said motor and being normally open and being adapted to being closed when said solenoid means is energized.

6. The apparatus of claim 1 wherein said generator means generates three-phase electrical energy;

panelboard means and means for deriving output energy from said generator means in wye fashion;

said load means being connected between one phase and neutral.

7. The apparatus of claim 1 wherein said generator means generates three-phase electrical energy;

panelboard means and means for deriving output energy from said generator means in delta fashion;

said load means being connected between one phase and neutral.

8. The apparatus of claim 1 wherein said motor means output shaft rotates at a first rpm value and said generator input shaft rotates at a second rpm value lower than said first value.

9. The apparatus of claim 2 further comprising hollow heating coil means positioned in said tank for receiving water through an inlet end and passing water through to an outlet end, said coil being immersed in the liquid in said tank to heat the water passing through said coil for domestic hot water applications.

* * * * *

UNITED STATES PATENT AND TRADEMARK OFFICE
CERTIFICATE OF CORRECTION

PATENT NO. : 4,289,954
DATED : September 15, 1981
INVENTOR(S) : R. Joseph Brognano and Albert Buonasera It is certified that error appears in the above—identified patent and that said Letters Patent is hereby corrected as shown below:

Column 2, line 34: Change "elemens" to --elements--.

Column 3, line 60: Change "cenrifugal" to --centrifugal--.

Column 4, line 10: Change "291$^a$" to --29a$^1$--.

Column 4, line 33: Change "provide" to --produce--.

Signed and Sealed this

Fourteenth Day of September 1982

[SEAL]

Attest:

GERALD J. MOSSINGHOFF

Attesting Officer — Commissioner of Patents and Trademarks